United States Patent

Lerche et al.

[11] Patent Number: 5,885,459
[45] Date of Patent: Mar. 23, 1999

[54] PROCESS FOR PURIFYING AND REUSING SURFACTANT-CONTAINING WASTE WATERS

[75] Inventors: Elke Lerche; Karin Kneist; Hartmut Rohbeck, all of Schwedt; Doris Hillemann, Schönermark; Ralf Schwarz, Schwedt, all of Germany

[73] Assignee: Buck Werke GmbH & Co., Germany

[21] Appl. No.: 702,520

[22] PCT Filed: Feb. 24, 1995

[86] PCT No.: PCT/DE95/00241

§ 371 Date: Nov. 25, 1996

§ 102(e) Date: Nov. 25, 1996

[87] PCT Pub. No.: WO95/24362

PCT Pub. Date: Sep. 14, 1995

[30] Foreign Application Priority Data

Mar. 8, 1994 [DE] Germany ............... 44 07 734.3

[51] Int. Cl.$^6$ ............... C02F 9/00; C02F 1/26; C02F 3/06
[52] U.S. Cl. ............... 210/602; 210/610; 210/615; 210/622; 210/631; 210/910; 210/912
[58] Field of Search ............... 210/603, 602, 210/608, 615–617, 610, 611, 620, 622, 631, 908–910, 912

[56] References Cited

U.S. PATENT DOCUMENTS

| | | | |
|---|---|---|---|
| 3,958,364 | 5/1976 | Schenck et al. | 210/602 |
| 4,292,176 | 9/1981 | Gratsch et al. | 210/631 |
| 5,240,600 | 8/1993 | Wang et al. | 210/615 |
| 5,580,770 | 12/1996 | DeFilippi | 210/615 |
| 5,599,443 | 2/1997 | Yamasaki et al. | 210/602 |
| 5,656,169 | 8/1997 | Lugowski et al. | 210/908 |

FOREIGN PATENT DOCUMENTS 0402158  12/1990  European Pat. Off. .

OTHER PUBLICATIONS

PCT International Preliminary Examination Report dated 18 Jun. 1996.

Primary Examiner—Thomas G. Wyse
Attorney, Agent, or Firm—Pendorf & Silverberg

[57] ABSTRACT

Waste water from a laundry (1) is collected in a storage container (3), fluffs and textile sheddings are separated through filtering sieves (2). The volume of the container is set so that it may store the amount of waste water produced for example during two days. The waste water is supplied with a bio-reactor (4) that works in aerobic conditions. Air is lead into the bio-reactor (4) at its lower end (5), establishing aerobic conditions therein. The biologically considered water leaves the bio-reactor (4) at the top end (6) of the column-shaped bio-reactor (4) and is supplied to an active coal column that acts as an adsorber (7). The adsorptively purified water leaves the adsorber (7) packed with active coal through the duct (8), is collected in a storage container (9) and if required is returned through duct (10) to the laundry, if required after 5 to 20% fresh water are added.

38 Claims, 3 Drawing Sheets

PROCESS FOR PURIFYING AND REUSING SURFACTANT-CONTAINING WASTE WATERS

BACKGROUND OF THE INVENTION

1. Field of the Invention

The invention concerns a process for purifying and reusing surfactant-containing waste waters from washing processes.

2. Description of the Related Art

The purification and reuse of surfactant-containing waste waters, in particular those such as produced by laundry facilities and car washes, as well as surfactant-containing waste waters from private households, represented technological challenge, since surfactants by nature present an extremely disruptive environment for organisms of all types, in particular the microorganisms of a mixed bioecology.

Above and beyond this, the industrial waste waters from a laundering process, in particular laundry waste waters or waste waters from car washes, comprise chemically relatively complex mixtures, which are extremely difficult to purify or to render reusable.

In particular, the waste waters from laundries are obviously strongly dependent in their quantitative and qualitative composition upon the detergents employed for the washing or as the case may be cleaning processes. Since universal detergents are primarily employed in the laundry facilities, the composition of the effluent is determined primarily, besides the textiles to be cleaned and the specific impurities contained therein, essentially by the composition of these universal detergents.

This type of universal detergent is comprised as a rule of an abundance of chemically varied substances, in particular anionic and non-ionic surfactants, fillers, compatibilizers, bleach agents, bleach activators, color preservers, corrosion inhibitors, stabilizers, anti-foaming agents, enzymes, optical brighteners as well as carriers and additive agents.

As anionic and non-ionic surfactants there can be mentioned for example alkylbenzolsulfonate, alcohol sulfate as well as alcohol ethoxylate.

As carriers generally zoelite A, sodium triphosphate and sodium carbonate are used. There is however an increasing modern trend for ecological reasons to avoid the use of phosphates and to replace these with ziolite and/or other silicates.

This type of carrier or filler is necessary, in order to enhance by a multiple the cleansing effect of the surfactant. In particular, the fat removing properties of the detergent or cleansing materials are strongly enhanced by the use of the fillers.

As co-fillers frequently a polycarboxylate is primarily used.

As bleaching agent, perborate, in particular sodium perborate as well as tetra acetyl ethylene diamine are used as bleach activators.

As fade inhibitors one employs mainly carboxymethyl-cellulose or, as the case may be, cellulose ether.

As corrosion inhibitors primarily alkaline silicate is employed.

Phosphonates serve as stabilizers and soaps, silicon oil and/or paraffin serve as foam inhibitors.

As enzymes primarily proteases and amylaces and sometimes however also lipases can be employed.

Above and beyond this, frequently optical brighteners comprised of stilbene or biphenyl distyryl types are employed.

Besides color materials, aromatic materials which can be added as a further ingredient frequently include sodium sulfate as a filler material or as the case may be as a production facilitating material.

The use of powder type universal laundry detergent in laundry facilities is experiencing increasing resistance to phosphates as ingredients and these phosphates are being replaced substantially with ziolites, soaps, citrates and amines, in particular tri- and monoethanolamine.

In particular, practically only phosphate-free laundry materials are being employed at this time in the United States and Japan as well as in the Netherlands, Germany, Switzerland, Austria and Italy and therewith in the effluent foam from laundry facilities.

In car wash facilities however a series of other substances end up in the effluent, for example, those which can be selected from: care substances for automobiles in particular waxes such as natural waxes or polyethylene based waxes, polishing substances; fatty substances; creams, in particular silicon fats, silicon oils, motor oil, transmission fluid, fuel, in particular gasoline and diesel fuel; antifreeze materials, in particular glycol; aminoxide; quaternary ammonium compounds; betaine; dialkyldimethyl ammonium salts, in particular chloride; rock salt; as well as mixtures thereof.

As a result of the above described complex composition of surface active agent (surfactant) laundry and cleansing solutions it follows that the chemistry of the respective effluent is extremely complex. As a result of legal requirements and ecological prohibitions the disposal of surfactant containing cleansing solutions in canals or sewage systems is in general to be avoided as a method of disposal. The manner of the treatment process and required investment are directly related to the respective type of treatment and the local regulations or as the case may be the discharge water laws. Acids or alkali cleansing materials must be neutralized. When treating emulsified oils a separation of the emulsion is necessary. Usually the result of an emulsion separation is that the oil content is not reduced to the prescribed legal limits, so that a subsequent flocking with aluminum or iron salts, frequently with supplementation of flocking assistants, must occur. With silicon-containing detergent solutions the salicylic acid which precipitates as a result of the neutralization causes an adsorption of oils and other organic substances.

In a waste water pre-treatment the surfactants found in the solutions are in large part removed along with the separation of the oils and fats insofar as they are oil soluble.

During the precipitation or as the case may be flocking of aluminum or iron phosphates or as the case may be hydroxides the chemical oxygen demand (COD-value) of the waste water, which is the most important factor in the determination of the waste water release, can be strongly reduced, insofar as the surfactants or also other adsorbable organic substances are brought out.

A further treatment possibility for the surfactant containing detergent solutions is the expensive and labor intensive ultrafiltration.

In the ultra-filtration there occurs, besides the effort and costs for the ultra-filtration membrane, the problem that though oil soluble non-ionic surfactants and anti-foaming materials are almost completely retained, water soluble non-ionic surfactants however almost completely pass through the membrane. With anionic surfactants there is established in comparison an equilibrium between membrane transmissive and retained surfactants (Kosswig/Stache, "The Surfactant" Carl Hanser Publishers Munich; Vienna (1993)).

The treatment of laundry waste water by ultra-filtration is extolled for example in DE-A 35 13 940, in particular for reclaiming of water and unspent wash active substances. This type of ultra-filtration system incurs however a high investment and maintenance cost. Above and beyond this the surfactants frequently lead, particularly after long use, to a disruption or damaging of the ultra-filtration membrane.

Beside the investment and maintenance expense for ultra-filtration systems, the above described effect results in only an incomplete retention of the surfactant and thus to a high surfactant containing effluent, which may not be disposed of in the canals.

A likewise quite expensive process for treatment and reuse of laundry and rinse waters is disclosed in DE-A 41 24 915. This laid open patent application teaches that a portion of the surfactant containing effluent water should be filtered and a part of the effluent should be treated by floatation for reclamation of rinse water.

This process is represented on the one hand as avoiding the problem of salting of the water. On the other hand, a demineralized-thus expensive, desalinated fresh water reclaimed through ionic exchangers out of the effluent water is added back as cleansing water, so that a moderate salt concentration results.

Preferably metal salts are employed as the floatation assistants in this technique representative of the state of the art.

Therewith this state of the art process has the disadvantage that the floating sludge resulting from the floatation process must be taken care of.

Beyond this the waste water is treated by pressure tension floatation, which again is associated on the one hand with a technical investment and on the other hand with a relatively high financial investment and maintenance cost.

A further possibility for carrying out the floatation according to the teaching of DE-A 41 24 915, lies in the carrying out of a so called electro-floatation in place of the metal salt treatment. This however is burdened with the disadvantage that an electro-floatation facility is relatively expensive and in addition does not solve the problem of how to take care of the resulting surfactant containing floatation sludge.

A further approach for the treatment of waste water, as occurs after the washing of clothing articles in large laundry facilities, is disclosed in DE-A 40 35 433. According to the therein disclosed process, the oil-in-water emulsion produced by large laundry facilities is separated out with the organic solvent perchloroethylene, in order to separate the waste water into a first, essentially aqueous fraction containing a small amount of oil fluid, which by ultra-filtration is separated out into water and disposable oil, and a second solution fraction, which is the phase containing the surfactants and oil, which by distillation is resolved into a disposable oil-impurity mixture and the solvent.

This process according to the state of the art exhibits however the substantial disadvantage, that it is associated with the utilization of an eco-toxicologically disadvantageous organic solvent, which ultimately enters into the environment certainly at least in trace amounts. On the other hand there is at least a necessity for carrying out an ultra-filtration step, which as discussed above is associated with disadvantages.

Further there is described in DE-A 33 05 238 a process for biological cleansing of water following a preliminary clarification with a pre-filter, wherein the water to be cleansed circulates in its own filter cycle. Beyond this there is accomplished by the filter circulation also the aeration or, as the case may be, the oxygenation by means of an air driven mammoth pump. The objective of DE-A 33 05 238 is comprised therein of providing a capable filter, which no longer needs to be cleaned under normal operating conditions, and with which an automatic separation of the accumulating sludge, dirt, and the like is possible. On the basis of the design of the filter described in this document as well as on the basis of the oxygen enrichment of the water in the filter, such a filter type is typically proposed for use as an aquarium filter.

It is further noteworthy that this kind of filter can be employed in intensive fish breeding. This is due to the fact, that the filter is comprised of a combination of biological filter and large dirt particle filter, since lava gravel is employed as the filter material.

This aquarium filter according to the state of the art of DE-A 33 05 238 can be associated with a downstream active charcoal filter for absorption of non-decomposable substances.

Although according to DE-A 33 05 238 the aquarium filter described therein should be capable of treatment of effluent waters from laundry facilities and other wet works as well as for treatment of industrial waste waters, there are however no references with respect to the type of waste water, in particular the relationship of surfactant containing waste water in respect to the bio-ecology mixture.

According to Kosswig and Stache, "The Surfactant", Carl Hanser Publishers, Munich Vienna, 1993, among the synthetic compounds the surfactants represent a special case for the transforming organisms—which as a rule are bacteria. Surfactants are namely substances which are active upon the interface surface. In comparison to other organic compounds which are dissolved in water, these are especially active upon the interface or surface. This applies also for cellular membranes. This fact is what facilities the purely physical substrate—organism (enzyme)—contact. It intensives however at the same time the effect of these compounds which in other context are desirable, namely the dispersion of lipids. The cytoplasmic membrane of the bacteria and other microorganisms are comprised of phospholipids, which are bound to a protein complex. The lipid layer is comprised of an asymmetric biomolecular film of triglyceride and phospholipids, of which the hydrophobic ends are oriented inwardly and which hydrophilic ends are directed outwardly facing the protein layer. From biochemical research it has become conventionally understood, that surfactants have a solublizing effect upon the membrane lipids when they reach a necessary minimum concentration on the cellular outer surface. In this way openings result in the membrane, which make possible an exodus of cytoplasm. This phenomena is exploited for example for the isolation of DNA from prokaryotic and eukaryotic cells.

The problem of the biological purification process for surfactant containing waste waters can also be recognized by the fact that the methods prescribed by the European Community for determination of the primary degradation of surfactants, the so called OECD-Screening-Test or, as the case may be, the OECD-Confirmatory-Test is based upon a test duration or period of 19 days in the Screening-Test and with a test duration of 21 days in the Confirmatory-Test.

According to the OECD-Screening-Test, surfactants, which after 19 days are at least 80% degraded, qualify for being classified as biologically degradable.

For this reason there has until now been no biological process for purification and reuse of surfactant containing waste waters.

SUMMARY OF THE INVENTION

It is thus the objective of the present invention to provide a process for purifying and reusing surfactant-containing waste waters, which is effective, rapid and cost effective.

The solution of the objective is accomplished by the characteristising features of patent claim 1.

The process according to the invention for purification and reuse of surfactant containing waste waters is optimally suited for purification of waste waters from washing processes, in particular waste waters from laundries or, as the case may be, large scale laundries, car washes as well as private households, and for use of the cleansed and treated water again as rinse water for the laundry or rinse, cleansing or for watering of greenery.

In an advantageous manner it is possible with the process according to the invention, by means of a biological step—namely a bio-reactor, which contains a surfactant waste water specific mixed culture, in conjunction with a adsorber step, to reuse up to about 95% of the waste water as feed water for the wash process.

Herein it is a particularly surprising fact that surfactant containing waste water can, as a rule, be treated biologically in a matter of a few hours up to about one day, such that a reduction in the organic content of up to about 80 to about 90% is achieved. This is so much the more surprising, since the OECD-Screening-Test and the OECD-Confirmatory-Test are based upon an assessment of biological degradability when surfactants are degraded to 80% within 19 or, as the case may be, 21 days, which for waste water treatment purposes is a slow reduction in surfactants.

The still remaining biological or, as the case may be, difficult to degrade contents are then removed from the water by means of a subsequent or downstream adsorber step and after passing through the adsorber are sufficiently removed.

As particularly preferred adsorber materials one may select activated charcoal. However other various adsorber material such as for example diatomaceous earth, silicon gel or other materials with greater inner surface area may be employed as adsorbers.

On the basis of the inventive process it is necessary to add essentially only approximately 5 to 20% of supplemental fresh water, so that an enormous saving in water is achieved.

A substantial advantage of the process according to the invention involving employment of bio-reactors lies in the realization of a closed cyclical flow path of the wash water. Thereby an effective saving of drinking and reduction of waste water is achieved, which as a result of the tendency toward a strong increase in prices of drink water supply or, as the case may be, waste water treatment has a significantly positive effect upon the economic cost justification as well as on the return of investment.

A further substantial advantage of the process according to the invention lies in the high ecological capability.

When compared to the hitherto employed processes for the waste water treatment such as flocking, neutralization or ultra-filtration, the process according to the invention, for the reason of the utilization of a bio-reactor, is a comparatively substantially better alternative, since the supplemental application of a chemical waste water treatment, for example by precipitation, flocking and/or floatation, can be dispensed with.

In addition to this, the biologically cleansed water according to the process of the invention has a lower hardness, which in the envisioned water circulation performance prevents calcification of the piping system and beyond this enables a substantial reduction in detergent requirements.

Therewith the process according to the invention contributes substantially to the preservation of the environment.

A particular advantage of the bio-reactors is comprised therein, that no large amount of entrained biomass is carried away, no continuous exodus of overproduction biomass follows out and biomass supplementation is not necessary.

Claim 2 refers to surfactant containing waste waters, which can preferably be treated or purified according to the process of the present invention. In particular the process according to the present invention is suited for cleaning up of surfactant containing waste waters from laundries, car washes, wash facilities for containers, in particular food stuff container means, such as, for example, bottles, glasses or the like, medicinal washing facilities such as for surgical instruments and/or containers, or private households.

When surfactant containing waste water from private households is to be used, then these are preferably used according to claim 3 with the exception of sewage water. This is easy to achieve by separate collection and treatment of the surfactant containing waste waters and the sewage effluent.

The surfactant containing water to be collected from private households is, after treatment and prior to reuse, preferably rendered bacteria free, for example by high energy UV-light and/or by means of ozonation, and can then be employed for example in the household water circulation, for example for the flushing to toilets or as rinse water or for watering or sprinkling.

Hereby vast quantities of drinking water can be saved and the waste water runoff via the communal waste water network is drastically reduced. The inventive process is particularly attractive for hotels, guest houses and restaurants, which have a high drinking water utilization.

According to claim 4, waste waters can be purified, which contain surfactants of practically any type, in particular however those, which originate from laundry detergents and washing compositions.

The advantageous further embodiments according to dependent claims 5, 6 and 7 correspond to the process according to the invention insofar as the therein named substances are today employed to a great extent in universal detergent and cleansing compositions which are employed in laundries as well as wash processes for example in car washes and/or in private households.

According to claim 8 it is preferred that the process according to the invention is to be used with waste waters which have an alkali pH, in particular a pH of approximately 8 to 11.

According to claim 9 it is preferred to treat waste waters which have a magnesium and/or iron content of less than 1%. It is however understandably also necessary to be able to carry out the process according to the invention with higher magnesium and/or iron contents or heavy metal contents. Should however the heavy metal content become too large, then in such cases suitable measures such as precipitation, flocking or supplemental adsorption can be carried out.

According to claim 10 waste water can be treated, which has a chemical oxygen demand (CSB) of approximately 150 to 2000 mg/l $O_2$.

This has the advantage, that therewith most of the industrially occurring surfactant containing waste waters can be purified with the process according to the invention. With the process according to the present invention all manner of surfactant containing waste waters can in principal be treated.

So it is for example entirely possible, that the inventive process is to be carried out with waste waters of a industrial scale kitchen cleaning facility, and to reuse the waste water as usable water.

Of particular importance is the treatment of textile laundry waste waters using the process according to the invention.

The use of a columnar bio-reactor according to claim 11 has the advantage of an optimal carrying out of the process. Naturally, however, bio-reactors of other designs and constructions can be employed.

The use of a hole or, as the case may be, a sieve floor cascade reactor according to claim 12, has the advantage that in such a bio-reactor type a flow process is carried out which takes advantage of the large surface area and makes possible an easy cleaning of the bio-reactor.

Use of a columnar reactor with an internally immovable surface area according to claim 13 has the advantage that on the one hand the oxygen entry into the bio-reactor can be facilitated and on other hand there is made possible an intimate bringing into contact with the bio-film found on the inner surface area of the bio-reactor in the form a mixed culture.

The charging of the waste water to be purified with air and/or oxygen in a continuous or parallel stream in the bio-reactor according to claim 14 has the advantage that thereby optimal aerobic conditions for the mixed culture on the inside of the reactor is achieved.

The bio-reactors used for the present invention are preferably constructed of an inert plastic and/or metal according to claim 15. According to claim 16 a laundry waste water specific mixed culture as appropriate to the degradation of the waste water content colonizes in place, or, as the case may be, in certain cases an inoculation may be necessary. The laundry waste water specific mixed colony for the process according to the present invention essentially comprises adapted aerobic heterotrophic bacteria as well as aerobic heterotrophic single cell organisms and multicellular animal organisms, in particular microorganisms.

There, where the air is introduced in the bio-reactor, which as a rule is in the lower end, can be found fluctuating oxygen and/or nutrient concentrations.

There for the large part bacteria are growing which tolerate without stress this type of oxygen variation and/or nutrient variation.

Beyond this there is to be found in this part, in the laundry waste water specific mixed bio-culture, also a collection of filamentous sulfur bacteria. Thereby the heterotrophic bacteria provide the large part of the degradation of the organic substances of the waste water.

If one is to move along with the air flow to the further upward lying compartments, then one will find protozoa, in particular, flagellates, which have a particularly high pH-tolerance of 4.7 to 9.6 and even higher.

As the next step of the mixed bio-culture one finds ciliates, here in particular *Uronema marinum* as well as in the substantially purified sections Vorticelles and *Oxytrichia fallax*.

As this point it is particularly worthy of mention, that the flagellates and ciliates eat for example Coliform and other bacteria, whereby an uncontrolled multiplication thereof is prevented.

Above and beyond this one finds in the laundry waste water specific mixed bio-culture also nematodes and rotifers (wheel-animals), also microscopic small multicellular animals, which eat and digest deceased biomass, fine particles, bacteria and ciliates.

The above described microorganisms comprise the characteristic mixed bio-culture for present invention, being in condition to degrade surfactant containing waste water, since they are derived from unpurified surfactant containing industrial waste waters and introduced onto the inner surface of the bio-reactor according to the present invention.

The use of activated charcoal as adsorber material according to claim 17 has on the one hand the advantage, that herewith a highly active adsorber material with large adsorption capacity is employed, which in addition is also economical and on the other hand is easy to dispose of.

The cleansed water obtained according to the process of the invention preferably exhibits a pH-value of approximately 6 to 10 according to patent claim 18, in particular approximately 8 to 9, with which it is in the region of the neutral condition, so that it can be returned to the laundry circulation without further adjustment of the pH.

Should it however be desirable to obtain a more neutral or slightly acidic water, then it is simple—for example by addition of $CO_2$—to adjust the pH value to 7 or less.

According to the parameters recited in claim 19, that approximately 80 to 95% of the utilized waste water is reclaimed for a renewed feeding or resupplying to a laundering or washing process as purified water, there results in an enormously economical process as well as to a rather quick return-of-investment.

Preferably, according to claim 20, the water losses associated with the process are made up by the addition of fresh water and not primarily by addition of demineralized or de-ionized water.

According to claim 21, the waste water to be purified is treated in the bio-reactor for between one and ten hours, in particular between two and six hours, preferably approximately four hours, wherein the bio-reactor may in given cases be configured for recycling. This has the advantage, that already after 4 hours frequently only 20% of the organic content compounds remain in the waste water and the remaining 80% have been metabolized by the laundry waste water specific mixed biocolony or culture.

According to claim 22, the water leaving the bio-reactor contains essentially only approximately 5 to 20% of the organic content of the waste water introduced at the supply side, which then may advantageously be simply removed by the downstream adsorber, so that the adsorber has long residence time before it must itself be disposed of or, as the case may be, changed out.

Preferably, according to claim 23, the waste water to be purified can in certain conditions be supplemented with specific nutrients for the mixed bioculture microorganisms, in the case that the microorganisms are unable to obtain a special nutrient from the introduced waste waters.

According to claim 24, the there indicated or listed filler or helper materials can likewise be removed from the water in accordance with the process of the invention, which is particularly advantageous for the reason that the fillers or additives indicated in claim 24 occur practically in very universal detergent and/or laundry soap.

Claim 25 lists preferred materials or material mixtures which occur in the waste water from car washes.

In certain cases an oil separation must be performed according to conventional methods on the surfactant containing waste waters from car wash facilities and the oil phase removed.

Further advantages and characteristics of the present invention can be found on the basis of the description of a preferred embodiment as well as also in view of the drawings.

BRIEF DESCRIPTION OF THE DRAWINGS

There is shown.

DETAILED DESCRIPTION OF THE INVENTION

EXAMPLE 1

Figure 1:
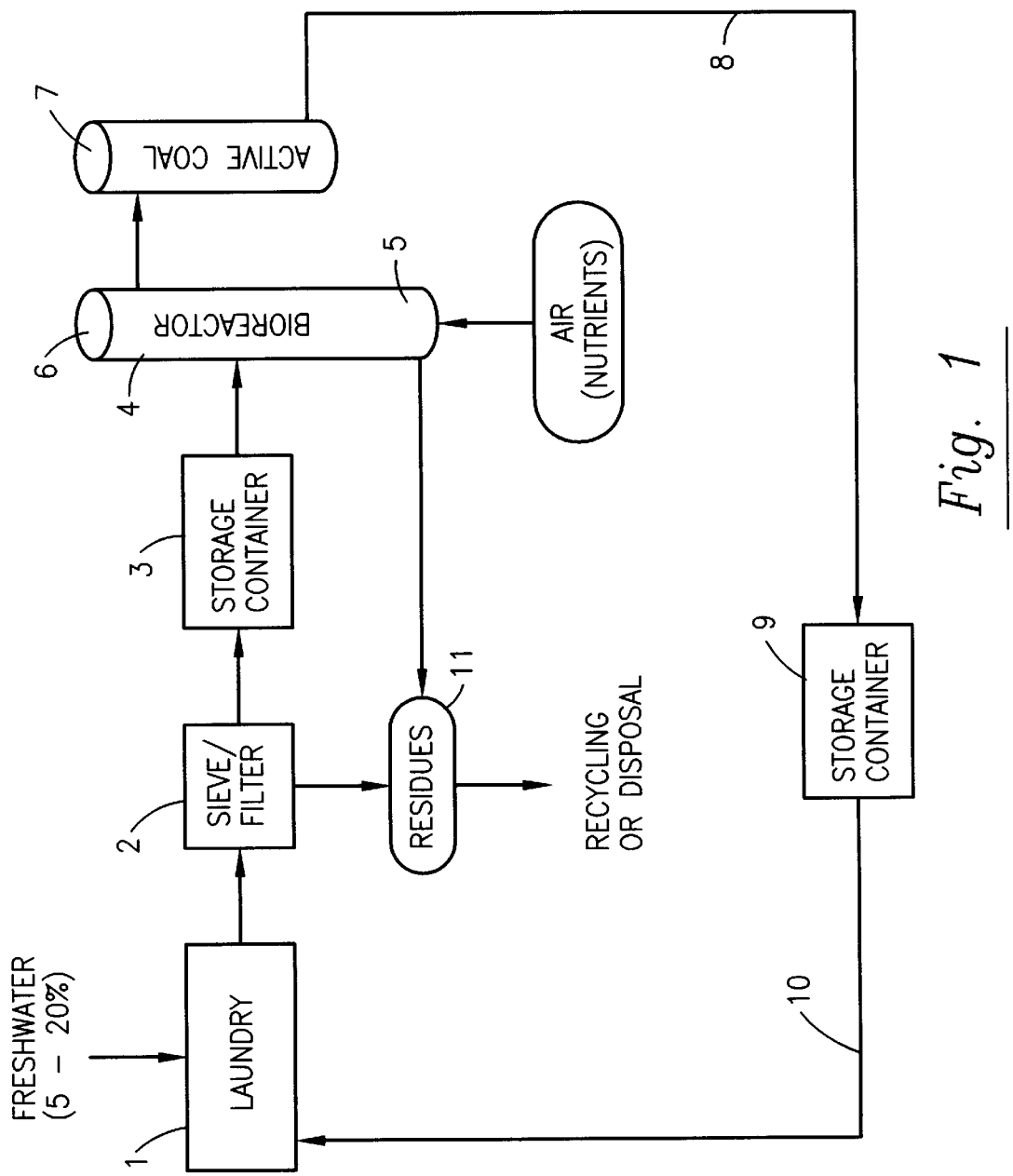
FIG. 1 the process according to the invention in schematic representation showing an example of the cleansing of laundry waste water FIG. 2 the process according to the invention in schematic representation showing an example of the cleansing of waste waters from car wash facilities.

The waste water of a laundry 1 is collected in a storage container 3, fluff or lint and textile sheddings are in large part removed by filter sieve 2. The volume of the container is so dimensioned, that for example two days worth of waste water can be stored.

The collected waste water exhibits the following values:

COD: 510 mg/l $O_2$ $BOD_5$: 200 mg/l $O_2$ pH: 8.0

Hardness: 5.6° dH

Conductivity: 1670 $\mu$S/cm

Total organic components: TOC=82 mg/l

A waste water of this type is supplied to a bio-reactor 4 that works under aerobic conditions. At the lower end 5 of the bio-reactor 4 air is introduced into the bio-reactor 4, so that aerobic conditions are formed. At the upper end 6 of the columnar shaped bio-reactor 4 the biologically treated water leaves the bio-reactor 4 and is conveyed to an active carbon column as adsorber 7. The now also adsorptively purified water leaves the activated charcoal packed adsorber 7 via conduit 8 and is then collected in the storage container 9 and when required is returned back to the laundry 1 via duct 10, wherein as required 5 to 20% fresh water is added in.

The water treated in accordance with the present invention exhibits the following values:

COD: 22.0 mg/l $O_2$ $BOD_5$: 5 mg/l $O_2$ pH: 8.2

Hardness: 5.6° dH

Conductivity: 1670 $\mu$S/cm

Total organic components: TOC=7 mg/l

Approximately every 35 weeks a back-flushing of the bio-reactor 4 is carried out, whereupon the residue 11 comprised essentially of biomass is then utilized or, as the case may be, disposed of.

The waste water to be treated has a residence time in the bio-reactor 4 of approximately 4 hours.

As in every biotechnological system, it is also necessary that the bio-reactor used in the inventive process be "broken in" (6 weeks).

This occurs preferably and in simple manner thereby, that one takes a number of samples of the bio-films formed in waste waters of industrial laundry facilities, for example textile laundry facilities, which have already been in operation for a long period of time, which films form the laundry specific mixed bio-colony, and uses these to inoculate the inner surface area of the bio-reactor to be colonized, preferably a cascade bio-reactor with a hole in the floor. This occurs thereby, that one suspends the bio-film material taken from the suitable industrial waste waters in water, optionally with supplemental nutrients, such as phosphates and/or nitrates and/or amino acids, and supplies this more or less synthetic waste water for several days in the bio-reactor to be broken in under aerobic conditions. Thereby a waste water specific mixed bio-colony colonizes the internal surface area of the bio-reactor, which is then in condition to degrade surfactant containing waste waters of the described type in accordance with the inventive process.

This inoculation or seating of the bio-reactor can be carried out reproducibly, always with the result, that surfactant containing waste waters are reduced in organic content by about 80%.

EXAMPLE 2

Figure 2:
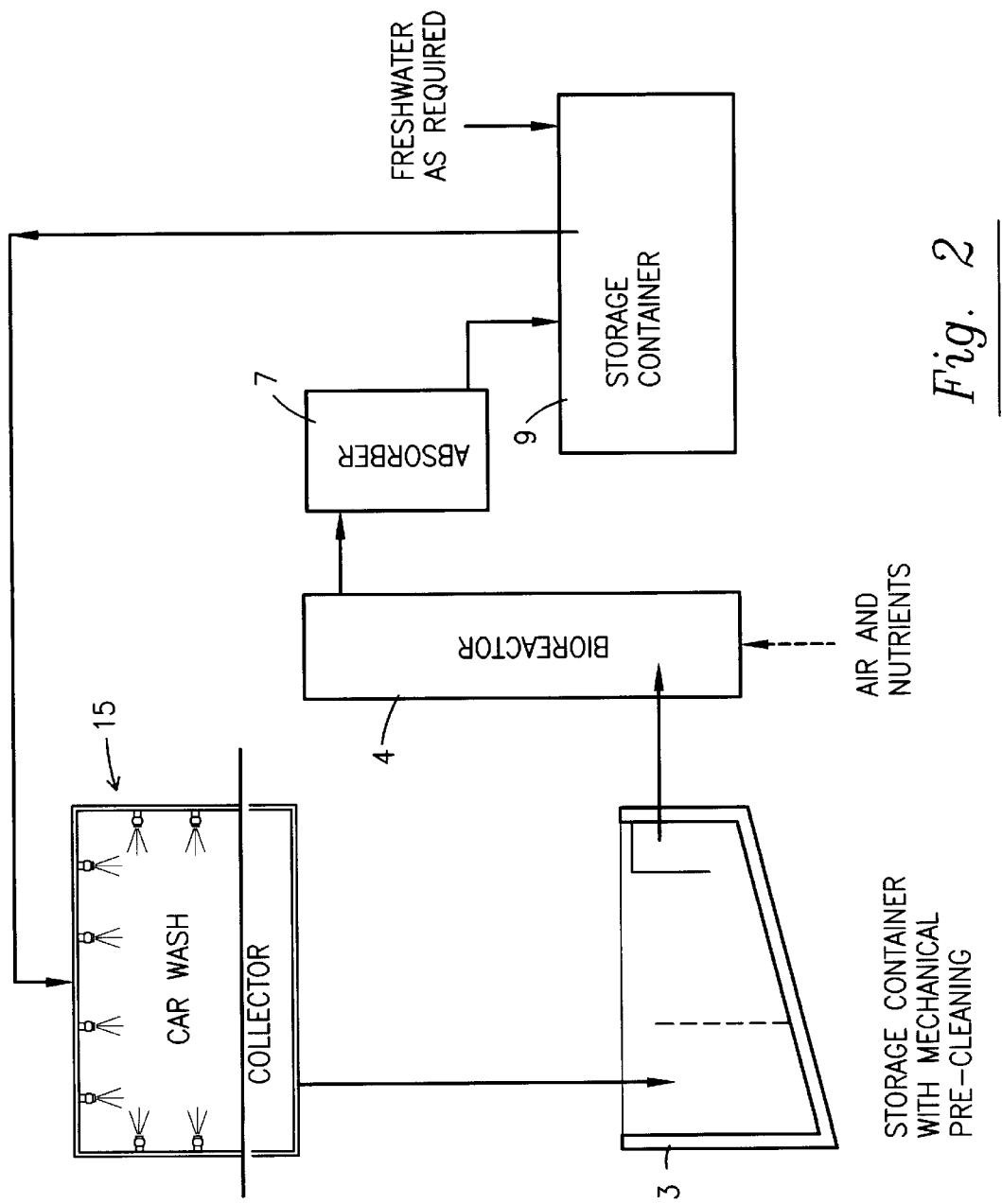

A system for water reclamation from car washes 15 can be carried out according to FIG. 2.

In FIG. 2 the same components as in FIG. 1 are indicated with the same reference numbers.

The soiled water produced in a car wash is collected in a special storage container 3. The container volume is so dimensioned, that a relatively even water mixture is stored (approximately 0.5 to 1.0 days worth of waste water). The mechanical pre-cleansing of sand and solid materials is accomplished by sedimentation in the storage container 3. The oil layer which forms along the upper surface is skimmed off, collected and appropriately disposed of.

In the bio-reactor 4 the introduced waste water is purified in a continuous flow-through under defined aerobic conditions and with addition of special nutrients. The dwell time of the water in the bio-reactor depends upon the loading of impurity. It lies somewhere between 4 and 8 hours.

The biologic purified water is conveyed to a mechanical supplemental cleansing step 7 for removal of escaped bio-flock. Next it is collected in a second storage container 9 and, according to need, is again supplied to the car wash 15. Spray and evaporation loss can be compensated by supplementation with fresh water.

EXAMPLE 3

Figure 3:
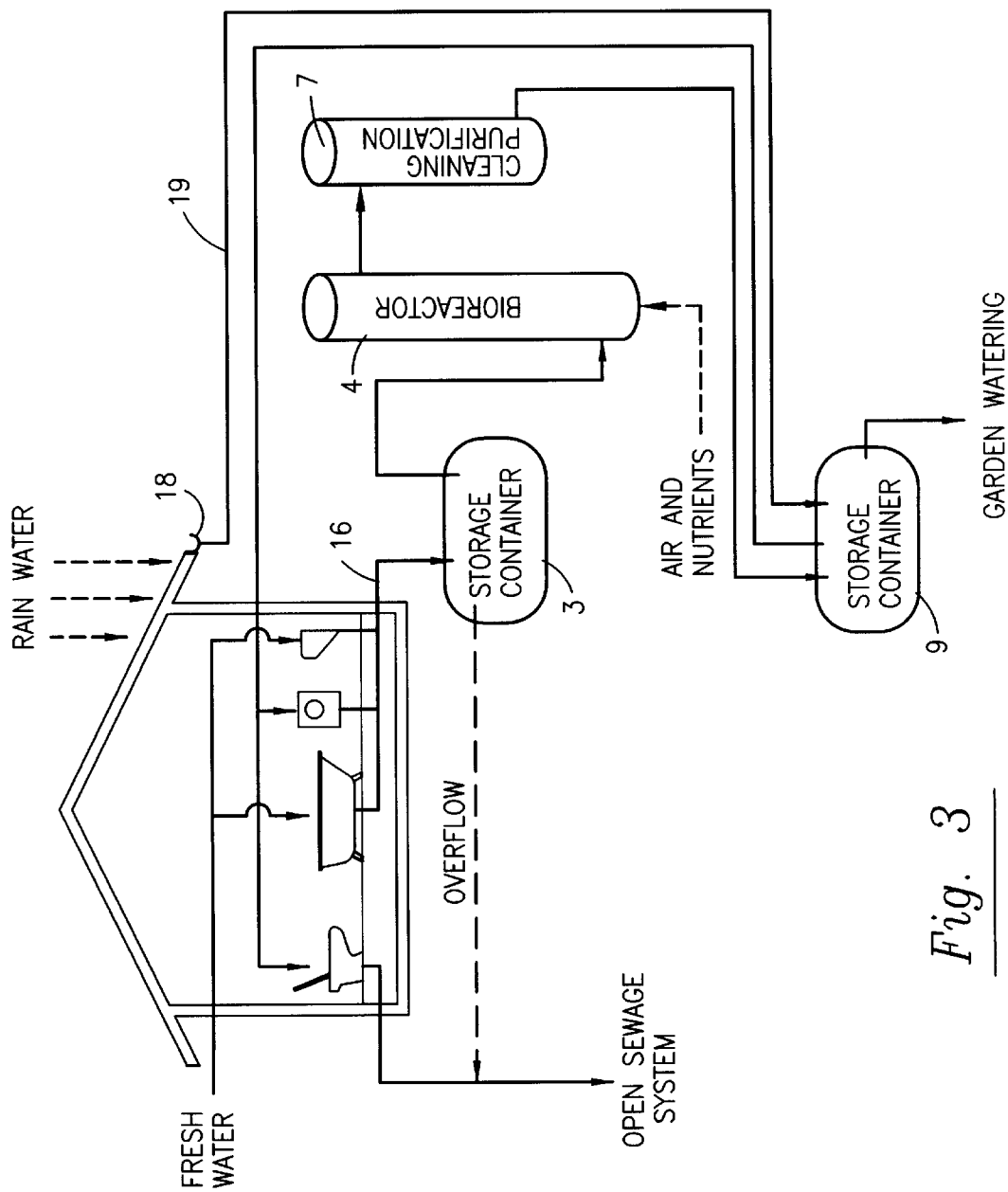
FIG. 3 the process according to the invention in schematic representation showing an example of cleansing of household waste water.

The waste water cycle flow path for private households or, as the case may be, larger dwellings (hotels, room rentals, etc.) is configured similarly, as already described in Examples 1 and 2 and as is schematically represented in FIG. 3.

The entire waste water 16 leaving the household, exclusive of the sewage water, which is conveyed directly to the sewage system, is collected in a sufficiently dimensioned storage container 3 and continuously conveyed to the bio-reactor 4 for purification. The volume of the storage container 3 is preferably such that a sufficient mixing of the waste water is accomplished and shock disturbances in the supply to the bio-reactor 4 are evened out.

In the biologic purification there follows a supplemental treatment step 7 for separation of possibly escaped bio-flock. It is recommended beyond this that the water be subject to an anti-microbial treatment, in order to prevent a biological growth in the second storage container 9. The purified water is available for the household water circulation, for example, for the flushing of the toilets, the laundry machine, for cleansing and rinsing water or for the watering of the garden, and thereby brings about a substantial savings in drink water. Additional advantageous effects can be accomplished, when a utilization of rain water is added into the described circulation, approximately in the manner, that the rain water is conveyed directly from the trough 18 via conduit 19 in the second storage container 9.

Therewith there is made available for the first time by means of the present invention a biological degradation process for surfactant containing waste waters. Obviously the process is not limited to the washing processes as described in the examples, but rather it can be employed advantageously for many types of water, laundry and purification processes, wherein the mixed bio-culture will comprise an appropriately constituted biological mix.

What is claimed is:

1. Process for purifying and reusing a surfactant containing waste water from a washing process, said purifying and reusing process comprising:

holding said waste water in a storage container and separating sinking and floating materials out of said waste water to produce a physically pre-cleansed waste water;

conveying this physically pre-cleansed waste water to a compartmented aerobic columnar bio-reactor, wherein said bio-reactor contains a mixed bio-culture including multicellular animals, said bio-culture adapted for biological decomposing of surfactant containing waste water, said bio-reactor supplied with air or oxygen in parallel with the stream of waste water to be purified;

conveying the water leaving the bio-reactor to an adsorber;

returning the physically and biologically purified water leaving the adsorber back to the washing process as feed water.

2. Process according to claim 1, wherein the waste waters are effluents from a source selected from the group consisting of laundries, car washes, facilities for the washing of containers for consumables, medicinal wash facilities, and private households.

3. Process according to claim 2, wherein said facility for washing containers is a facility for washing consumable material containing containers.

4. Process according to claim 2, wherein said medical wash facility is a facility for washing surgical instruments and/or containers.

5. Process according to claim 1, wherein surfactant containing waste waters from private households are treated; and wherein the purified waste water is additionally subjected to a treated against microbes prior to reuse.

6. Process according to claim 5, wherein said household water is sewage free.

7. Process according to claim 1, wherein said waste water being treated contains at least one surfactant selected from group consisting of:

anionic surfactants selected from the group consisting of carboxylates, soaps, fatty alkylethercarboxylates, alkyl sulfates, alkyl phosphates, alkyl ether phosphates, alkyl benzol sulfates, olefin sulfonates, alkane sulfates, and succinic acid esters;

non-ionic surfactants selected from the group consisting of oxyethylates, fatty acid alkanolamides, polyhydroxy compounds, alkyloligoglycosides and alkylpolyglycosides; and cationic surfactants selected from the group consisting of tetraalkylammonium salts, imidazolinium salts; as well as mixtures thereof.

8. Process according to claim 1, wherein said waste waters being treated additionally contain anions, which are selected from the group consisting of inorganic anions selected from the group consisting of nitrates, nitrites, sulfates, sulfites, sulfides, hydrogen sulfites, phosphonates, phosphates, oligo- and polyphosphates, hydrogen phosphates, hydroxides, halogenides, silicates; and organic anions selected from the group consisting of carbonic acid anions; substituted carbonic acid anions; as well as mixtures thereof.

9. Process according to claim 8, wherein said halogenides are chlorides, and wherein said organic anions are selected from the group consisting of acetates, citrates, and tartrates.

10. Process according to claim 1, wherein said waste water being treated additionally contains cations select from the group consisting of alkali cations selected from the group consisting of sodium cations, calcium cations, alkali earth cations, iron cations, manganese cations, and other heavy metal cations, as well as mixtures thereof.

11. Process according to claim 1, wherein said waste water being treated additionally contains chelate formers and/or chelate complexes.

12. Process as in claim 11, wherein said chelate formers and/or chelate complexes are chelate nuclei for bivalent cations.

13. Process as in claim 12, wherein said chelate nuclei for bivalent cations are selected from the group consisting of calcium and/or magnesium.

14. Process according to claim 1, wherein said waste water being treated has an alkaline pH.

15. Process according to claim 1, wherein the pH of said waste water being treated is initially from approximately 8 to 11.

16. Process according to claim 1, wherein said waste water being treated which has a manganese content of less than 1%.

17. Process according to claim 1, wherein said waste water being treated which has an iron content of less than 1%.

18. Process according to claim 1, wherein said waste water being treated has a chemical oxygen demand (COD) of approximately 500 to 2000 mg/l $O_2$.

19. Process according to claim 1, wherein said waste water being treated has a chemical oxygen demand (COD) of approximately 500 to 800 mg/l $O_2$.

20. Process according to claim 1, wherein the bio-reactor is a cascade reactor with a hole or sieve floor.

21. Process according to claim 1, wherein as the bio-reactor is a bio-reactor which is comprised of inert plastic and/or metal.

22. Process according to claim 1, wherein a surfactant containing waste water specific mixed bio-culture is pre-cultivated and inoculated upon the inner surfaces of the bio-reactor.

23. Process according to claim 22, wherein said waste water specific mixed bio-culture is a laundry waste water specific mixed bio-culture.

24. Process according to claim 1, wherein activated charcoal is employed as the adsorber.

25. Process according to claim 1, wherein the adsorber is in the form of a column.

26. Process according to claim 1, wherein the purified waste water has a pH of approximately 6 to 10.

27. Process according to claim 1, wherein the purified waste water has a pH of approximately 8 to 9.

28. Process according to claim 1, wherein approximately 80 to 95% of the treated waste water is reclaimed for a return supply to the washing process as purified water.

29. Process according to claim 1, wherein process-related water losses are replaced by supplementation of fresh water.

30. Process according to claim 1, wherein the waste water to be purified has a residency in the bio-reactor of between 1 and 10 hours.

31. Process according to claim 1, wherein the waste water to be purified has a residency in the bio-reactor of between 2 and 6 hours.

32. Process according to claim 1, wherein the waste water to be purified has a residency in the bio-reactor of between 1 and 10 hours, and the bio-reactor is configured as a closed loop.

33. Process according to claim 1, wherein the water leaving the bio-reactor substantially contains approximately only 5 to 20% of the organic contents of the introduced waste water.

34. Process according to claim 1, wherein the waste water to be purified is supplemented as necessary with nutrients for the mixed bio-culture of microorganisms.

35. Process according to claim 1, wherein the waste water to be treated contains washing assistants, which are selected from the group consisting of additives;

co-additives;

bleach agents, as well as bleach activators;

fade preventatives;

stabilizers, foam inhibitors;

enzymes;

optical brighteners; and fillers; dyes, aromatic compounds;

as well as mixtures thereof.

36. Process according to claim 35, wherein said additives are selected from the group consisting of ortho- and condensed-phosphates, borates, silicates, alkali, zeolites, and complex additives;

said co-additive is polycarboxylate;

said bleach agent is perborate;

said fade preventatives are selected from the group consisting of carboxymethylcellulose and cellulose ether;

said enzymes are selected from the group consisting of lipases, proteases, and amylases;

said optical brighteners are selected from the group consisting of stilbene and diphenyldistyryl derivatives; and said filler is sodium sulfate.

37. Process according to claim 1, wherein the waste water to be treated contains compounds selected from the group consisting of: car care products; polishing substances; fatty substances; lubricants; fuels; anti-freeze; aminoxide; quaternary ammonium complexes; betaine; dialkyl dimethyl ammonium salts; rock salts; as well as mixtures thereof.

38. Process according to claim 37, wherein said car care products are waxes comprised of natural wax or polyethylene base; wherein said lubricants are selected from the group consisting of silicon fats, silicon oils, motor oils, transmission oils; where said fuels are selected from the group consisting of gasoline and diesel fuels; wherein said anti-freeze is a glycol; and wherein said dialkyl dimethyl ammonium salt is a chloride.

* * * * *